Patented July 18, 1939

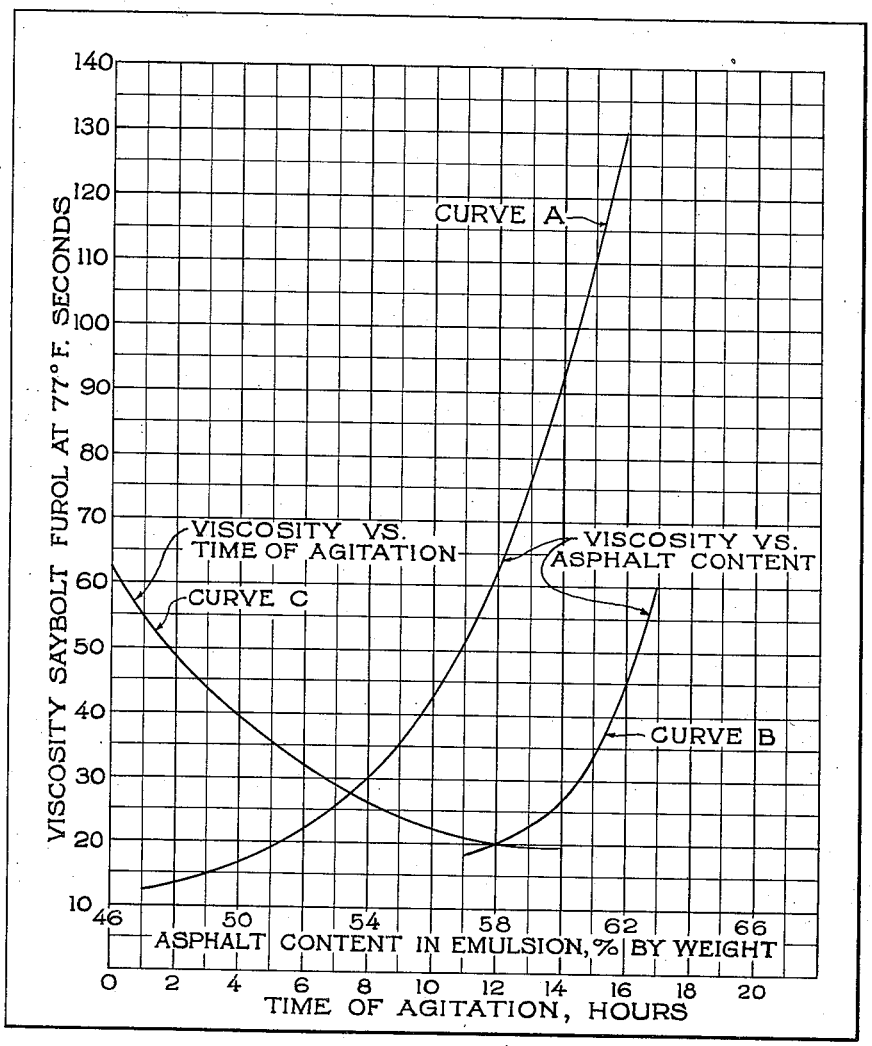

2,166,541

UNITED STATES PATENT OFFICE 2,166,541

EMULSIONS AND PROCESS FOR PRODUCING THE SAME

Ulric B. Bray, Palos Verdes Estates, and Lawton B. Beckwith, San Pedro, Calif., assignors to Union Oil Company of California, Los Angeles, Calif., a corporation of California Application April 27, 1936, Serial No. 76,528

9 Claims. (Cl. 134—1)

The present invention relates to improved aqueous emulsions of bituminous substances, such as bitumen, asphalt, pitch, tar and tar-like substances, resins and other bituminous substances of natural or artificial origin and to processes for producing said improved emulsions. The invention relates particularly to the production of asphalt emulsions having low viscosities.

It is generally known that bituminous emulsions are suitably employed as binders, adhesives and coating compositions and are particularly employed in road building by the cold laying process by the so-called penetration and mixing methods. When roads are built by the so-called penetration method, the emulsion is sprayed, poured or pumped on the surface of the aggregate which has been evenly distributed on the road bed. For this purpose, it is desirable to employ an emulsion which breaks rapidly when applied to the aggregate. The emulsions used for this purpose are commonly known as quick-breaking emulsions. However, when the road is constructed by the mixing method, the emulsion is either premixed with the aggregate and then applied to the road bed or it may be blade mixed with the aggregate in situ, i. e. upon the road bed, the mixture of aggregate and emulsion being worked across the road bed by means of a blade until the emulsion coats each particle of aggregate. This is followed by tamping and rolling operations. When roads are built by this method, it is desirable to employ an emulsion which breaks slowly and such emulsions are commonly referred to as slow breaking emulsions.

Bituminous emulsions for road building have heretofore been produced by heating the bituminous substance, such as asphalt, to a temperature above its melting point and then adding a small proportion of a saponifiable material, such as, for example, a fatty acid, resin or resin oil after which the melted mixture is agitated at an elevated temperature with an aqueous solution of alkali, such as, for example, caustic soda or potash or sodium or potassium carbonate. The emulsion is then passed into a storage tank where it is allowed to cool principally by radiation.

In another method, the asphalt is melted and then agitated with a dilute aqueous alkaline solution. In this process, the addition of the saponifiable ingredient such as fatty acid resin or resin oil to the asphalt or to the aqueous alkaline solution is omitted and the emulsification is accomplished merely by the saponification of naturally present saponifiable materials in the asphalt itself. Such emulsions, if properly prepared, may be of the quick-breaking type. When it is desired to convert such quick-breaking emulsions into those of the slow-breaking type, a small amount of soap or other stabilizing agent is incorporated into the emulsion. The emulsion, while hot, is then passed to storage and then allowed to cool. The present invention relates to an improvement in the production of the aforementioned bituminous emulsions.

We have discovered that a particularly desirable characteristic of a bituminous emulsion for road laying purposes, whether quick-breaking or slow-breaking, is its property to spread evenly when applied to the aggregate, to properly wet and coat the aggregate and to permit the asphalt particles to coalesce readily. We have discovered that emulsions of low viscosities, say below 30 seconds Saybolt furol at 77° F. possess the aforementioned desirable characteristics of spreading evenly upon the aggregate, coating and wetting each particle of aggregate and coalescing properly but when the viscosity is above the aforementioned figure, the asphalt particles do not wet the aggregate evenly. The high viscosity emulsions have a buttery consistency when applied to the aggregate so that when either the penetration or the blade-mixing method for building the road is employed, it is impossible to obtain an even distribution of the asphalt particles in the aggregate.

Heretofore, it has been possible to produce asphalt emulsions of proper low viscosity by limiting the asphalt content in the emulsion and by choosing a proper grade of asphalt. For example, by choosing a California asphalt obtained from Poso Creek crude oil and by limiting the asphalt content to not over 55% by weight, preferably not over 50%, and by obtaining a partial cooling of the emulsion by circulation through cooling coils before it is passed to storage, it is possible to obtain an emulsion having a viscosity as low as 30 seconds Saybolt furol at 77° F. However, it is not economically desirable to produce emulsions of low asphalt contents due to the increase in cost of handling and shipping such emulsions for a given asphalt content on the road. In other words, it is desirable that the dispersion contain as much asphalt as is possible and yet be a suitable water continuous emulsion for the purposes intended.

It is, therefore, an object of our invention to produce a water continuous emulsion, i. e. an oil-in-water emulsion, having a low viscosity.

A further object of our invention resides in producing either quick or slow breaking emulsions containing a greater amount of asphalt for a given low viscosity. Thus, it is an object of our invention to produce an emulsion containing approximately 60% asphalt by weight and having a viscosity of 30 seconds or less Saybolt furol at 77° F.

Various other objects, features and advantages of our invention will become apparent to those skilled in the art from the following description of the methods outlined for compounding the dispersion which is given herein for the purpose of illustrating and explaining the invention and which is not to be considered as limiting.

We have discovered that aqueous emulsions of asphalt, for example, having low viscosities of approximately 30 seconds or less Saybolt furol at 77° F. and containing a greater amount of asphalt than emulsions heretofore produced may be made by emulsifying the melted asphalt at an elevated temperature with a suitable emulsifying agent in accordance with methods heretofore carried out and then agitating the emulsion after cooling it to a temperature of approximately 120° F. or below for a sufficiently long period of time of approximately 15 to 24 hours, depending upon the degree of agitation. It has been found that the agitation after the emulsion has been cooled to 120° F. or below reduces the viscosity of the emulsion. On the other hand, it has been found that when the emulsion at an elevated temperature of, say 200° F. which is the temperature necessary to produce most asphalt emulsions, is passed to storage and then allowed to cool without substantial agitation, the cooled emulsion has such a high viscosity as to render it less desirable for use in road making or for other purposes.

Also, where the emulsion is allowed to cool somewhat but not below 120° F. with agitation subsequent to the formation of the emulsion as has been the practice of certain refineries heretofore and the emulsion is then allowed to cool to the handling and application temperature without agitation, such emulsions, while possessing slightly lower viscosities than emulsions which are cooled without agitation after their formation by passing them to storage tanks, are yet not sufficiently low to render them suitable for road laying purposes. In other words, agitation of the finished emulsion at elevated temperatures, such as above 150° F., no matter how thorough or for how long a period of time, has very little effect on the final viscosity of the emulsion when cooled to handling and applying temperatures of, say 100° F. or lower. Thus, the use of a colloid mill for obtaining the dispersion of the asphalt in the liquid phase or for use in homogenizing a rough dispersion in the aqueous phase has very little effect on the viscosity of the emulsion if the temperature of milling is above about 120° F. If, however, the emulsion is first cooled to about 120° F., or lower, and is then passed through the colloid mill, a marked reduction in the viscosity of the emulsion is obtained which is in keeping with the spirit of the invention.

The reason for the phenomenon that a reduction in viscosity is obtained by agitation of the emulsion after cooling to 120° F. or lower is not definitely known and consequently we do not wish to be bound by theory. However, it is believed that the temperature to which the emulsion must be cooled with simultaneous or subsequent agitation is in the neighborhood of the melting point of the asphalt present in the emulsion. Most asphalts employed in emulsions for road building purposes have melting points of approximately 90° F. to 120° F. Consequently, the emulsions should be cooled to a temperature below 120° F. before the desired effect of viscosity reduction by agitation may be obtained. Another possible theory is that the temperature of about 120° F. is the approximate point at which gellation of the aqueous phase containing the soap takes place. After the soap is gelled, due to the lowering of the temperature, the gel structure may be broken up by the agitation and if the emulsion is never again heated above the temperature at which gellation takes place, the reduction in viscosity will be substantially permanent.

In order to point out the invention more clearly, we have illustrated in the accompanying graph the effect upon the viscosities of emulsions with and without agitation of the emulsion after cooling to 100° F. In the graph, curves A and B are representations of a number of emulsions having varying asphalt contents, while curve C illustrates the effect of agitation on viscosity of a particular emulsion. Curves A and B have as their abscissa the scale designated as "asphalt content in emulsion, per cent by weight" while curve C has as its abscissa the scale designated as "time of agitation, hours". In each case, the emulsions for curves A and B were produced by heating an asphalt produced from Poso Creek crude oil, the asphalt having a penetration of about 175 at 77° F. and a melting point of about 102° F. to a temperature of about 320° F., after which the melted asphalt was passed through a mixing device comprising a centrifugal pump by means of which an aqueous solution of sodium hydroxide only containing 0.12 to 0.15% by weight of sodium hydroxide based upon the finished emulsion was intimately mixed with the melted asphalt. The agitation by circulating the emulsion through the mixing devices was continued until the asphalt was finely dispersed in the caustic soda solution. The emulsions thus produced were quick-breaking emulsions.

Upon completion of the emulsification of the asphalt at a temperature of approximately 200° F., the emulsions representing curve A were cooled rapidly to 100° F. without substantial agitation, while the emulsions representing curve B were cooled slowly with a long period of agitation by circulating the emulsions through cooling coils for a period of about 15 to 24 hours. During circulation of the latter emulsions through the cooling coils, the temperature fell rather quickly to about 140° F. and then gradually tapered off to about 100° F. The emulsions were agitated further at the latter temperature by continued circulation for approximately 10 to 12 hours.

A direct comparison is thus made between emulsions produced by agitation after cooling and emulsions produced without agitation after cooling. Thus, in the case of the emulsions plotted for both curves A and B, it will be seen that as the asphalt content in the emulsion is increased, its viscosity is also increased. However, for any given asphalt content in the emulsion, agitation after cooling results in an emulsion of considerably lower viscosity than the same emulsion produced without agitation after cooling. Thus, by reference to the graph, it will be readily seen that for the same viscosity of 20 seconds Saybolt furol at 77° F., the emulsion produced by agitation after cooling contained about 57.5% by weight of asphalt, while emulsions produced without agitation after cooling contained only 51.5% by weight of asphalt. When the respective emulsions contained about 62% of asphalt, the viscosity of the emulsion produced by agitation after cooling had a viscosity of only 45 seconds while that produced without agitation had about 130 seconds Saybolt furol at 77° F. it is thus seen that with the present invention for a given viscosity, it is possible to use a higher percentage of asphalt in the emulsion which is necessary for certain specifications and for economy in shipping and handling due to the excess water.

The effect of the duration of agitation after cooling to 100° F. on the viscosity of the emulsion is illustrated in curve C. The emulsion used for obtaining the data for this curve was produced according to the aforementioned method employed for producing the emulsions of curves A and B and with the same asphalt except that the asphalt content was limited to about 58% by weight. The emulsion as produced at about 200° F. was cooled rapidly to 100° F. in about 4 hours. This was accomplished by circulation through cooling coils. After such cooling, the emulsion had a viscosity of about 62.5 seconds Saybolt furol at 77° F. The emulsion was then agitated by circulation through the cooling coils and back to the tank containing the bulk of the emulsion and samples were drawn approximately every two hours for about 12 hours in order to obtain a viscosity determination. It will be seen that as the agitation was continued at 100° F., the viscosity of the emulsion gradually dropped to 20 seconds Saybolt furol at 77° F. at the end of the 12 hours of agitation.

Thus, from what has been stated heretofore, it is possible to produce the asphalt emulsion suitable for road building purposes, by melting an asphalt of say 90° to 120° F. melting point (ball and ring method) which is the melting point of the usual asphalts employed for road building purposes and then mixing approximately 58 to 60% by weight of the melted asphalt at a temperature of about 320° F. with an aqueous solution containing approximately 0.12 to 0.15% by weight caustic soda based upon the finished emulsion, the mixing temperature being maintained at approximately 200° F. until emulsification of the asphalt is considered complete. From this point, there may be several possible modifications of the process, each finally accomplishing the desired result of producing emulsion having low viscosities of about 20 to 25 seconds Saybolt furol at 77° F. The emulsion thus produced may be passed to storage and then allowed to cool to atmospheric temperatures by radiation from the tank which requires approximately 15 to 36 hours or longer. Such emulsion would have a viscosity of about 60 to 100 seconds Saybolt furol at 77° F. This emulsion may then be withdrawn from the storage tank as desired and circulated through agitating devices, such as a centrifugal pump for a period of 4 to 15 hours depending upon the degree of agitation and the extent of reduction in viscosity necessary.

As an alternative method, the emulsion produced at 200° F. may be cooled rapidly to 100° F. in about 1 to 4 hours by circulation through cooling coils in which case the viscosity at the end of the cooling period will be about 50 to 65 seconds Saybolt furol at 77° F. which is slightly lower than when the emulsion is allowed to cool solely by radiation in a tank. The cooled emulsion may then be agitated for about 2 to 14 hours in the manner previously stated. One desirable method of operation is to produce the emulsion at 200° F. by circulation through mixing devices and then continue the circulation through cooling coils until the temperature is reduced to about 100° F. Circulation is continued at this temperature for the necessary time to produce the emulsion of desired viscosity.

In the foregoing description, it will be observed that the emulsions described were produced employing sodium hydroxide as the emulsifying agent and that quick breaking emulsions were produced. However, it will be observed that the invention is not to be considered as being limited to this process. Instead of sodium hydroxide, we may employ other alkaline materials such as potassium hydroxide, sodium or potassium carbonate and the like. If desired, a stabilizing agent may be added to the quick-breaking emulsion in order to change it to a slow-breaking emulsion. As stabilizing agents, we may employ a small amount of such proteins and carbohydrates as casein, glue, blood albumen, starch, gum acacia, agar agar, algin, gum tragacanth, pectin and the like. Preferably, such stabilizers are added to the emulsion after it has been cooled to a temperature of 100° F. or below and may be added during the period of agitation for viscosity reduction. We may produce the emulsion employing other emulsifying agents heretofore known such as such soaps as sodium or potassium oleate, resinate, stearate or palmitate or alkaline salts such as sodium phenate, cresolate, silicate or borate. In other words, the invention embraces broadly the production of an emulsion employing any of the known emulsifying agents and methods for producing the emulsion at an elevated temperature and is only limited to the feature of agitating the emulsion for a prolonged period of time after it has been cooled to a sufficiently low temperature of which many variations may be made by those skilled in the art.

We claim:

1. A process for producing an aqueous bituminous emulsion of low viscosity containing in excess of 50% by weight of bitumen which comprises melting bitumen, commingling said melted bitumen with a sufficient amount of an aqueous solution containing an emulsifying agent to produce a fluid emulsion of the quick-breaking type containing in excess of approximately 50% by weight of the bitumen and which emulsion when cooled to a temperature of approximately 120° F. or below without substantial agitation results in an emulsion of relatively high viscosity, cooling said emulsion to a temperature of approximately 120° F. or below and agitating said cooled emulsion for a sufficient period of time to reduce the viscosity of said emulsion to approximately 30 seconds or less Saybolt furol at 77° F.

2. A process as in claim 1 in which the amount of bitumen employed to produce said quick-breaking emulsion is approximately 60% by weight.

3. A bituminous emulsion of the quick-breaking type comprising a mixture of bitumen in excess of 50% by weight and less than approximately 50% by weight of an aqueous solution containing an emulsifying agent, said emulsion having a Saybolt furol viscosity at 77° F. of 30 seconds or less.

4. A bituminous emulsion of the quick breaking type comprising a mixture of approximately 60% by weight of bitumen and approximately 40% by weight of an aqueous solution containing an emulsifying agent, said emulsion having a Saybolt furol viscosity at 77° F. of 30 seconds or less.

5. A process for producing an aqueous bituminous emulsion of low viscosity containing in excess of 50% by weight of bitumen, which comprises melting the bitumen, commingling the melted bitumen with a sufficient amount of water and an emulsifying agent to produce a liquid emulsion containing in excess of 50% by weight of bitumen, and which emulsion when cooled to a temperature of approximately 120° F. or below without substantial agitation results in an emulsion of relatively high viscosity, cooling said emulsion to a temperature of approximately 120° F. or below, and agitating said cooled emulsion for a sufficient period of time to reduce the viscosity of said emulsion to a Saybolt furol viscosity at 77° F. of about 30 to 60 seconds.

6. A process for producing an aqueous bituminous emulsion of low viscosity containing in excess of 50% by weight of bitumen, which comprises melting the bitumen, commingling the melted bitumen with a sufficient amount of water and an emulsifying agent to produce a liquid emulsion containing in excess of 50% by weight of bitumen, and which emulsion when cooled to a temperature of approximately 120° F. or below without substantial agitation results in an emulsion of relatively high viscosity, cooling said emulsion to a temperature of approximately 120° F. or below, and agitating said cooled emulsion for a sufficient period of time to reduce the viscosity of said emulsion to a Saybolt furol viscosity at 77° F. of about 30 seconds or less.

7. A process for producing an aqueous bituminuous emulsion of low viscosity containing in excess of 50% by weight of bitumen, which comprises melting the bitumen, commingling the melted bitumen with a sufficient amount of water and an emulsifying agent to produce a liquid emulsion containing in excess of 50% by weight of bitumen, and which emulsion when cooled to a temperature of approximately 120° F. or below without substantial agitation results in an emulsion of relatively high viscosity, cooling said emulsion to a temperature of approximately 120° F. or below, agitating said cooled emulsion for a sufficient period of time to reduce the viscosity of said emulsion to a point materially less than the viscosity of the emulsion when cooled to a temperature of approximately 120° F. or below without substantial agitation, whereby an emulsion is produced upon such substantial agitation and cooling capable of containing from about 3 to 6% of asphalt more than an emulsion of the same viscosity so produced but without such substantial agitation and cooling.

8. A bituminous emulsion of aqueous type comprising a mixture of bitumen of about 55 to 60% by weight and from about 45 to 40% by weight of water and containing an emulsifying agent, said emulsion having a Saybolt furol viscosity at 77° F. of 30 seconds or less.

9. A process of producing an aqueous emulsion of low viscosity containing from about 57 to about 62% by weight of bitumen which comprises melting the bitumen and commingling said melted bitumen with sufficient amount of water and an emulsifying agent to produce a liquid emulsion containing from about 57 to 62% by weight of bitumen, and which emulsion when cooled to a temperature of approximately 120° F. or below without substantial agitation results in an emulsion having a Saybolt furol viscosity at 77° F. of about 50 or more seconds, cooling said emulsion to a temperature of approximately 120° F. or below, and agitating said cooled emulsion for a sufficient period of time to reduce said viscosity to less than about 50 seconds Saybolt furol at 77° F., whereby emulsions are produced containing from about 57 to about 62% by weight of bitumen, which emulsions are adapted to contain several percent more asphalt than emulsions produced of the same viscosity and within the same weight percent range when so produced but without substantial agitation and said cooling.

ULRIC B. BRAY.
LAWTON B. BECKWITH.